United States Patent
Boertjes

(10) Patent No.: US 9,831,947 B2
(45) Date of Patent: Nov. 28, 2017

(54) MARGIN DETERMINATION SYSTEMS AND METHODS IN OPTICAL NETWORKS

(71) Applicant: Ciena Corporation, Hanover, MD (US)

(72) Inventor: David W. Boertjes, Nepean (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 15/133,610

(22) Filed: Apr. 20, 2016

(65) Prior Publication Data
US 2017/0310392 A1    Oct. 26, 2017

(51) Int. Cl.
  H04B 10/06    (2006.01)
  H04B 10/079   (2013.01)
  H04B 10/564   (2013.01)
  H04Q 11/00    (2006.01)

(52) U.S. Cl.
  CPC ... *H04B 10/07953* (2013.01); *H04B 10/0793* (2013.01); *H04B 10/564* (2013.01); *H04Q 11/0066* (2013.01); *H04Q 2011/0083* (2013.01)

(58) Field of Classification Search
  CPC . H04B 10/0795; H04B 10/60; H04B 10/2507
  See application file for complete search history.

(56) References Cited

U.S. PATENT DOCUMENTS

| | | | |
|---|---|---|---|
| 5,363,408 A | 11/1994 | Paik et al. | |
| 5,541,955 A | 7/1996 | Jacobsmeyer | |
| 5,764,699 A | 6/1998 | Needham et al. | |
| 5,909,469 A | 6/1999 | Frodigh et al. | |
| 5,946,104 A | 8/1999 | Yoshida | |
| 6,459,832 B1 | 10/2002 | Smith et al. | |
| 6,496,297 B1 | 12/2002 | Frankel et al. | |
| 6,795,394 B1 | 9/2004 | Swinkels et al. | |
| 6,829,251 B2 | 12/2004 | Duvaut et al. | |
| 6,904,082 B2 | 6/2005 | Jones | |
| 7,016,296 B2 | 3/2006 | Hartman | |
| 7,020,073 B2 | 3/2006 | Kadoua et al. | |
| 7,099,597 B2 | 8/2006 | Saunders et al. | |
| 7,308,052 B2 | 12/2007 | Cheng et al. | |
| 7,391,728 B2 | 6/2008 | Natarajan et al. | |
| 7,415,208 B1 | 8/2008 | Haggans et al. | |
| 7,474,903 B2 | 1/2009 | Kim et al. | |
| 7,542,514 B2 | 6/2009 | Song et al. | |
| 7,561,797 B1 | 7/2009 | Harley et al. | |
| 7,574,134 B2 | 8/2009 | Frankel | |

(Continued)

OTHER PUBLICATIONS

Ciena Corporation, "Enabling a Bigger and Smarter Network With Ciena's Wavelogic 3", Application Note, AN085 Aug. 2013.

(Continued)

*Primary Examiner* — Dzung Tran
(74) *Attorney, Agent, or Firm* — Clements Bernard Walker PLLC; Christopher L. Bernard; Lawrence A. Baratta, Jr.

(57) ABSTRACT

Systems and methods for determining margin in an optical network include changing powers of signals from one or more transmitters; measuring noise at one or more receivers each communicatively coupled to the one or more transmitters; and determining margin between the one or more transmitters and the one or more receivers based on the associated measured noise. The changing, the measuring, and the determining are performed in-service while the one or more transmitters are each transmitting data-bearing signals.

20 Claims, 7 Drawing Sheets

(56) References Cited

U.S. PATENT DOCUMENTS

| | | |
|---|---|---|
| 7,602,814 B2 | 10/2009 | Meagher et al. |
| 7,609,757 B2 | 10/2009 | Jones |
| 7,634,194 B2 | 12/2009 | Frankel et al. |
| 7,764,707 B2 | 7/2010 | Li |
| 7,792,044 B2 | 9/2010 | Holness et al. |
| 7,817,656 B1 | 10/2010 | Deng et al. |
| 7,826,752 B1 | 11/2010 | Zanoni et al. |
| 7,962,049 B2 | 6/2011 | Mateosky et al. |
| 8,005,375 B2 | 8/2011 | Frankel |
| 8,009,692 B2 | 8/2011 | Basso et al. |
| 8,009,985 B1 | 8/2011 | Roberts et al. |
| 8,023,396 B2 | 9/2011 | Hartman |
| 8,045,855 B2 | 10/2011 | Frankel |
| 8,259,861 B2 | 9/2012 | Kuhtz |
| 8,295,175 B2 | 10/2012 | Ellis et al. |
| 8,364,036 B2 | 1/2013 | Boertjes et al. |
| 8,402,121 B2 | 3/2013 | Skalecki et al. |
| 8,467,687 B2 | 6/2013 | Sasaki et al. |
| 8,509,621 B2 | 8/2013 | Boertjes et al. |
| 8,532,498 B2 | 9/2013 | Shpantzer |
| 8,553,551 B2 | 10/2013 | Spector |
| 8,553,707 B2 | 10/2013 | Swinkels et al. |
| 8,707,137 B2 | 4/2014 | Arye |
| 2002/0159121 A1 | 10/2002 | Spickermann |
| 2002/0186432 A1 | 12/2002 | Roorda et al. |
| 2003/0091004 A1 | 5/2003 | Tang |
| 2003/0231706 A1 | 12/2003 | Hwang |
| 2004/0156644 A1 | 8/2004 | Fuse et al. |
| 2004/0184398 A1 | 9/2004 | Walton et al. |
| 2004/0247314 A1 | 12/2004 | Kawarai |
| 2005/0036444 A1 | 2/2005 | Park et al. |
| 2005/0047517 A1 | 3/2005 | Georgios et al. |
| 2006/0029398 A1 | 2/2006 | Liu et al. |
| 2006/0129525 A1 | 6/2006 | Rijpkema |
| 2007/0036084 A1 | 2/2007 | Lindsay et al. |
| 2007/0110002 A1 | 5/2007 | Yang |
| 2007/0166032 A1 | 7/2007 | Frankel |
| 2007/0230594 A1 | 10/2007 | Mo et al. |
| 2007/0253388 A1 | 11/2007 | Pietraski |
| 2007/0268814 A1 | 11/2007 | Li |
| 2008/0025728 A1 | 1/2008 | Shpantzer et al. |
| 2008/0037982 A1 | 2/2008 | Nivens-Jenkins et al. |
| 2008/0225381 A1 | 9/2008 | Heffner et al. |
| 2009/0003301 A1 | 1/2009 | Reial et al. |
| 2009/0022497 A1 | 1/2009 | Mateosky et al. |
| 2009/0103931 A1 | 4/2009 | Grigoryan et al. |
| 2009/0147896 A1 | 6/2009 | Frankel et al. |
| 2009/0168922 A1 | 7/2009 | Malladi et al. |
| 2009/0169204 A1 | 7/2009 | Meagher et al. |
| 2009/0169208 A1 | 7/2009 | Grigoryan et al. |
| 2009/0169217 A1 | 7/2009 | Meagher et al. |
| 2009/0196602 A1 | 8/2009 | Saunders et al. |
| 2009/0205007 A1 | 8/2009 | Woodward |
| 2009/0214212 A1 | 8/2009 | Vorbeck et al. |
| 2010/0008617 A1 | 1/2010 | Marrakchi El Fellah et al. |
| 2010/0014500 A1 | 1/2010 | Lee |
| 2010/0021166 A1 | 1/2010 | Way |
| 2010/0054144 A1 | 3/2010 | Choi et al. |
| 2010/0142943 A1 | 6/2010 | Frankel et al. |
| 2010/0329686 A1 | 12/2010 | Frankel |
| 2011/0013911 A1 | 1/2011 | Alexander et al. |
| 2011/0033195 A1 | 2/2011 | Frankel |
| 2011/0122787 A1 | 5/2011 | Wang |
| 2011/0171914 A1* | 7/2011 | Kim ............... H04L 1/0026 455/68 |
| 2011/0176815 A1 | 7/2011 | Frankel et al. |
| 2011/0222394 A1 | 9/2011 | Swinkels et al. |
| 2011/0222846 A1 | 9/2011 | Boertjes et al. |
| 2011/0229149 A1 | 9/2011 | Grubb et al. |
| 2011/0255870 A1 | 10/2011 | Grigoryan et al. |
| 2012/0163820 A1 | 6/2012 | Dangui et al. |
| 2012/0201130 A1 | 8/2012 | Liu et al. |
| 2012/0219288 A1 | 8/2012 | Roberts et al. |
| 2012/0219293 A1 | 8/2012 | Boertjes et al. |
| 2012/0328305 A1 | 12/2012 | Rahn et al. |
| 2013/0209089 A1 | 8/2013 | Harley et al. |
| 2013/0209091 A1 | 8/2013 | Mateosky et al. |
| 2013/0216232 A1 | 8/2013 | Zanoni et al. |
| 2013/0236169 A1 | 9/2013 | Gaudette et al. |
| 2013/0272318 A1 | 10/2013 | Swinkels et al. |
| 2013/0308948 A1 | 11/2013 | Swinkels et al. |
| 2013/0336649 A1 | 12/2013 | Essiambre et al. |
| 2014/0341595 A1 | 11/2014 | Harley et al. |
| 2015/0333824 A1* | 11/2015 | Swinkels ............ H04J 14/0227 398/25 |
| 2017/0019149 A1* | 1/2017 | Oksman ................ H04B 3/46 |
| 2017/0026129 A1* | 1/2017 | Henry .................. H01P 5/12 |

OTHER PUBLICATIONS

Gho et al., "Rate-Adaptive Coding for Optical Fiber Transmission Systems," IEEE Journal of Lightwave Technology, vol. 29, No. 2, Jan. 15, 2011.

Shafik et al, "On the Extended Relationships Among EVM, BER and SNR as Performance Metrics," Dec. 2006, ICECE, pp. 408-411.

Moosavi et al, "A Fast Scheme for Blind Identification of Channel Codes," Dec. 2011, IEEE, pp. 1-5.

Recommendation ITU-T G.977. Series G: Transmission Systems and Media, Digital Systems and Networks. Apr. 2011.

* cited by examiner

MARGIN DETERMINATION SYSTEMS AND METHODS IN OPTICAL NETWORKS

FIELD OF THE DISCLOSURE

The present disclosure generally relates to optical networking systems and methods. More particularly, the present disclosure relates to margin determination systems and methods in optical networks.

BACKGROUND OF THE DISCLOSURE

Fiber optic communication networks are experiencing rapidly increasing growth in capacity. This capacity growth is reflected by individual channel data rates, scaling from 10 Gbps (gigabits per second), to 40 Gbps, to developing 100 Gbps, and to future projections of 1000 Gbps channels and beyond. The capacity growth is also reflected by increasing total channel count and/or optical spectrum carried within an optical fiber. In the past, optical channels were deployed with a fixed capacity in terms of bandwidth as well as a fixed amount of overhead for forward error correction (FEC). For example, in a conventional system deployment, channels are deployed at 10 Gbps or 40 Gbps (plus associated overhead for FEC). These channels are designed to provide fixed data throughput capacity of 10 Gbps or 40 Gbps. Moreover, the performance limits of these channels are established assuming that the system is operating at full capacity, with all the optical channels present. The first in channels will operate in much more benign condition and have significant extra margin available. This margin is not utilized until much later in the lifecycle of the system. For example, a single wavelength deployed on a new optical line system could have more than 10 dB of excess margin that is not currently utilized (without adding new hardware). This unused margin can be considered wasted and forcing the system to operate in a non-cost effective way. If this extra margin could be utilized, even in a temporary way, to enhance data throughput of the modem, for example, the economics of the system would be significantly improved.

Of note, next generation optical modems are equipped with the capability to support variable data throughput applications. Moreover, this capability will be provisionable. Therefore, depending on the opportunity, it would be advantageous to provision a modem at a higher data throughput when the extra margin is available on new and low channel count deployments, usage of these next generation modem will allow to mine and use this excess margin and wasted capacity without requiring additional hardware. However, this excess margin could disappear as the channel counts approach full fill.

It would be advantageous to have systems and methods for determining what margin exists in an optical network. Conventional systems perform optimization mainly without the benefits of actual margin measurements. A simplified approach optimizes performance and determines margin based on fixed channel power targets into different fiber types, and this can be a calculation, such as from external tools. Other approaches can use Optical Signal-to-Noise Ratio (OSNR) optimization, either measured by a system using Optical Performance Monitors (OPMs) or estimated through modeling. The main limitation of these approaches is they are not able to take advantage of the existing knowledge of the performance of the data-bearing channels. This can be used to improve system resiliency or to increase capacity. One specific unknown in these systems is the contribution of non-linear noise to the performance of the channel.

BRIEF SUMMARY OF THE DISCLOSURE

In an exemplary embodiment, a method of determining margin in an optical network includes changing powers of signals from one or more transmitters; measuring noise at one or more receivers each communicatively coupled to the one or more transmitters; and determining margin between the one or more transmitters and the one or more receivers based on the associated measured noise. The measured noise can be separated between linear noise which is proportional to power and nonlinear noise which is proportional to power squared. The method can further include applying digital noise while changing the powers. The changing, the measuring, and the determining can be performed in-service while the one or more transmitters are each transmitting data-bearing signals. The changing can include changing a single transmitter at a time and the measuring noise can include determining cross phase modulation based on relationships between neighboring signals and self-phase modulation based on a signals relationship with itself at the launch powers. The changing can include changing a group of signals at a time and the measuring noise can include determining cross phase modulation based on relationships between neighboring signals and self-phase modulation based on a signals relationship with itself at the launch powers. The changing powers can include changing launch powers of the one or more signals, in-service while the one or more signals carry data-bearing signals. The changing powers can include changing amplifier output powers, in-service while the one or more signals carry data-bearing signals. The method can further include utilizing the determined margin with one or more of modulation format for the one or more transmitters, dispersion compensation, and nonlinear pre-compensation. The method can further include utilizing the determined margin in one or more of a control plane, a Software Defined Networking (SDN) controller, a network management system, and a network planning system as part of routing constraints for path selection.

In another exemplary embodiment, an apparatus adapted to determine margin in an optical network includes circuitry adapted to change powers of signals from one or more transmitters; circuitry adapted to measure noise at one or more receivers each communicatively coupled to the one or more transmitters; and circuitry adapted to determine margin between the one or more transmitters and the one or more receivers based on the associated measured noise. The measured noise can be separated between linear noise which is proportional to power and nonlinear noise which is proportional to power squared. The apparatus can further include circuitry adapted to apply digital noise while changing the powers. The circuitry can operate in-service while the one or more transmitters are each transmitting data-bearing signals. The circuitry adapted to change powers can include changing a single transmitter at a time and the circuitry adapted to measure noise can include determining cross phase modulation based on relationships between neighboring signals and self-phase modulation based on a signals relationship with itself at the launch powers. The circuitry adapted to change powers can include changing a group of signals at a time and the circuitry adapted to measure noise can include determining cross phase modulation based on relationships between neighboring signals and self-phase modulation based on a signals relationship with itself at the launch powers. The circuitry adapted to change powers can include changing launch powers of the one or more signals, in-service while the one or more signals carry data-bearing signals. The circuitry adapted to change powers can include changing amplifier output powers, in-service while the one or more signals carry data-bearing signals. The apparatus can further include circuitry adapted to utilize the determined margin with one or more of modulation format for the one or more transmitters, dispersion compensation, and nonlinear pre-compensation; and circuitry adapted to utilize the determined margin in one or more of a control plane, a Software Defined Networking (SDN) controller, a network management system, and a network planning system as part of routing constraints for path selection.

In a further exemplary embodiment, a server adapted to determine margin in an optical network includes a processor; and memory storing instructions that, when executed, cause the processor to cause a change powers of signals from one or more transmitters, cause a measurement of at or by one or more receivers each communicatively coupled to the one or more transmitters, and determine margin between the one or more transmitters and the one or more receivers based on the associated measured noise.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, margin determination systems and methods in optical networks are described. The systems and method include various aspects of system planning and optimization, implemented using real time feedback from optical modems in optical networks. Specifically, the feedback is in the form of margin estimation. In an exemplary embodiment, the systems and methods can use digital noise loading techniques. In various exemplary aspects, the systems and methods provide system-level margin determinations which advantageously can be used in optical systems or with optical modems that support flexible bandwidth. For example, the systems and methods can include 1. Using the system as a control to provide perturbation to separate single channel penalty contributions to a single metric provided by an optical modem;
2. Using system level knowledge to separate multichannel effects from the single metric provided by the optical modem; and
3. Driving system level optimization from margin metrics measured by the optical modems.

Specifically, the systems and methods provide system-level margin determination since an individual optical modem cannot make autonomous capacity optimizing decisions in a non-linear system, such as an optical network.

Exemplary Optical Network

Figure 1:
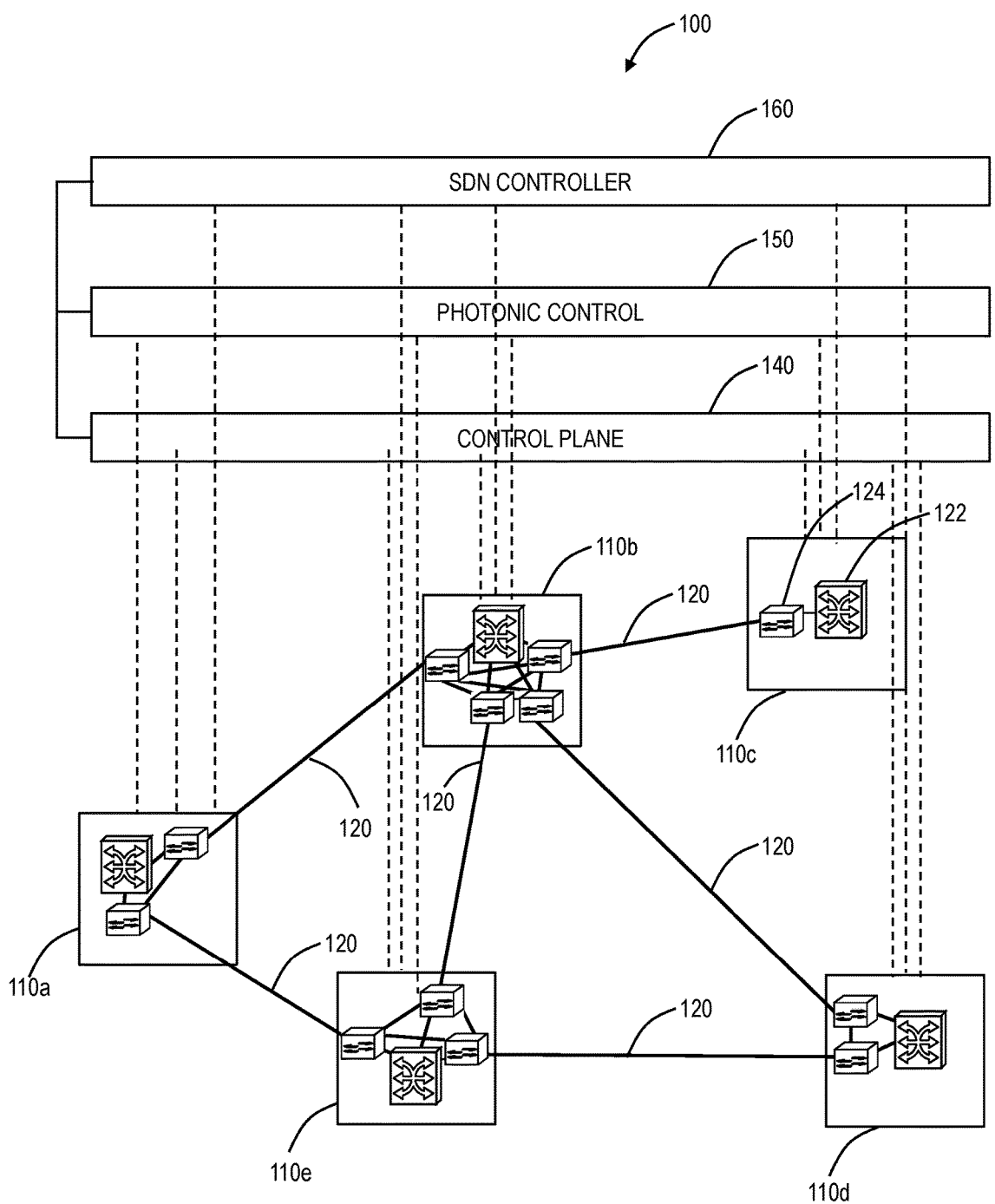
FIG. 1 is a network diagram of an exemplary network with five interconnected sites.

Referring to FIG. 1, in an exemplary embodiment, a network diagram illustrates an exemplary network 100 with five interconnected sites 110a, 110b, 110c, 110d, 110e. The sites 110 are interconnected through a plurality of links 120. Each of the sites 110 can include a switch 122 and one or more WDM network elements 124. The switch 122 is configured to provide services at Layers 1 (e.g., OTN/SONET/SDH) and/or Layer 2 (e.g., Ethernet). The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of ordinary skill in the switch 122 and the WDM network elements 124 may be realized in the same network element. The photonic layer and the photonic control operating thereon can also include intermediate amplifiers and/or regenerators on the links 120 which are omitted for illustration purposes. The network 100 is illustrated, for example, as an interconnected mesh network, and those of ordinary skill in the art will recognize the network 100 can include other architectures, with additional sites 110 or with fewer nodes sites, with additional network elements and hardware, etc. The network 100 is presented herein as an exemplary embodiment for the margin-based optimization systems and methods.

The sites 110 communicate with one another optically over the links 120. The sites 110 can be network elements which include a plurality of ingress and egress ports forming the links 120. Further, the nodes 110 can include various degrees, i.e. the site 110c is a one-degree node, the sites 110a, 110d are two-degree nodes, the site 110e is a three-degree node, and the site 110b is a four-degree node. The number of degrees is indicative of the number of adjacent nodes at each particular node. The network 100 includes a control plane 140 operating on and/or between the switches 122 at the sites 110a, 110b, 110c, 110d, 110e. The control plane 140 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an exemplary embodiment, the control plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the network 100 and the control plane 140 can utilize any type control plane for controlling the switches 122 and establishing connections.

Service routing in the control plane 140 is well known. A path (e.g., a subnetwork connection (SNC) or label switched path (LSP)) is considered valid for connection setup based on the availability of the switch 122, the links 120, and sufficient bandwidth available thereon. Photonic networks, i.e. Layer 0 and the wavelength interconnectivity of the WDM network elements 124, introduce the additional complexity of successfully setting up a service up. This can require that all Layer 0 services are pre-planned and/or managed manually. For example, potential paths for services at the photonic layer can be pre-planned by modeling them offline using a static snapshot of the network state to ensure that the computed paths are optically viable in terms of reach, nonlinear effects, dispersion, wavelength contention/blocking, etc. Here, the forecast tolerant engineering ensures that each wavelength placed into service will work in a worst case Optical Signal to Noise Ratio (OSNR) leading to potential excess margin.

The links 120 can include N channels (or wavelengths), denoted as $\lambda_1$-$\lambda_n$. For example, the number N can be the maximum supported channels on the link 120. Additionally, the number N can be variable with respect to flexible grid channels (e.g., channels taking an arbitrary and variable amount of spectrum). For example, N can be 44 for 100 GHz channel spacing, 88 for 50 GHz channel spacing, or any combination in between to deliver between 36 and 88 wavelengths or more with flexible grid channels. Other embodiments are also contemplated. From a link engineering perspective, the link 120 is designed and implemented day one to support a full-fill of channels. However, greenfield installation or first-in builds (i.e., new) typically only include one or a couple of channels. Also, it can often take the time to move from a couple of channels to a full complement of the N channels on the link 120. This can be referred to as a forecast tolerant modeling scheme where the link 120 is designed to support a full-fill that will eventually be realized, but is likely, not present in first in builds. Thus, from a system capacity perspective, the link 120 has unutilized and unknown margin and capacity in the first-in builds and where the link 120 has less than N channels deployed thereon.

The network 100 can include photonic control 150 which can be viewed as a control plane and/or control algorithm/loop for managing wavelengths from a physical perspective at Layer 0. In one aspect, the photonic control 150 is configured to add/remove wavelengths from the links in a controlled manner to minimize impacts to existing, in-service wavelengths. For example, the photonic control 150 can adjust modem launch powers, optical amplifier gain, variable optical attenuator (VOA) settings, wavelength selective switch (WSS) parameters, etc. In the systems and method described herein, the photonic control 150 is adapted also to perform network optimization on the links 120. This optimization can also include re-optimization where appropriate. In the systems and methods, the photonic control 150 can adjust the modulation format, baud rate, frequency, wavelength, spectral width, etc. of the modems in addition to the aforementioned components at the photonic layer.

The network 100 can also include a Software Defined Networking (SDN) controller 160. SDN allows management of network services through abstraction of lower level functionality. This is done by decoupling the system that makes decisions about where traffic is sent (SDN control through the SDN controller 160) from the underlying systems that forward traffic to the selected destination (i.e., the physical equipment in the network 100). Work on SDN calls for the ability to centrally program provisioning of forwarding on the network 100 in order for more flexible and precise control over network resources to support new services. The SDN controller 160 is a processing device that has a global view of the network 100. Additionally, the SDN controller 160 can include or connect to SDN applications which can utilize the data from the SDN controller 160 for various purposes. In an exemplary embodiment, the SDN applications include a margin optimization application which is described in detail herein.

Figure 2:
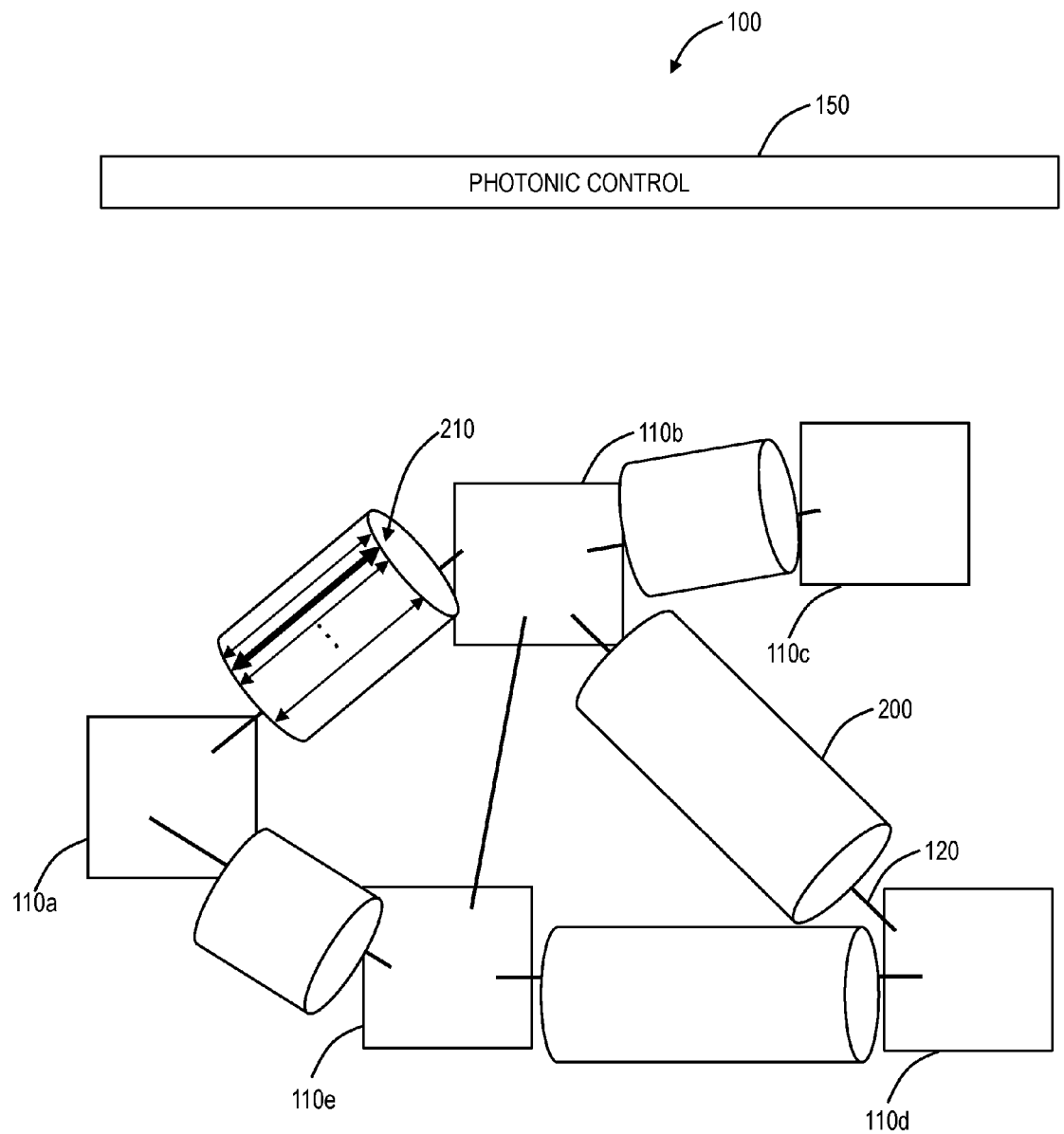
FIG. 2 is a logical network diagram of the network of FIG. 1 with the links logically shown carrying various wavelengths.

Referring to FIG. 2, in an exemplary embodiment, a logical network diagram illustrates the network 100 of FIG. 1 with the links 120 logically shown carrying various wavelengths. The links 120 are shown with an optical fiber 200 which can include any type of optical fiber. For example, the optical fiber 200 can include a useable optical spectrum of 1530 nm to 1565 nm (C-Band). Of course, other use of other portions of the spectrum are contemplated. The optical fiber 200 can be a flexible grid, a fixed grid, or a combination across the optical spectrum. Thus, each of the links 120 and their associated optical fiber 200 can support a fixed or variable number of wavelengths 210 (wavelengths can also be referred to as optical signals). The wavelengths 210 traverse a channel which carries an underlying service between two of the sites 110 in the network. Each of the wavelengths 210 is formed by optical modems at two sites 110 where the channel is added/dropped (or regenerated). Since the network 100 is an interconnected mesh, the wavelengths 210 may be different on each of the links 120. Parameters associated with each of the wavelengths 210 can include—A-Z path in the network, spectrum allocation (e.g., fixed spectrum, flexible spectrum, the amount of spectrum, location on the spectrum, etc.), modulation format, baud rate, FEC parameters, optical power, etc.

Figure 3:
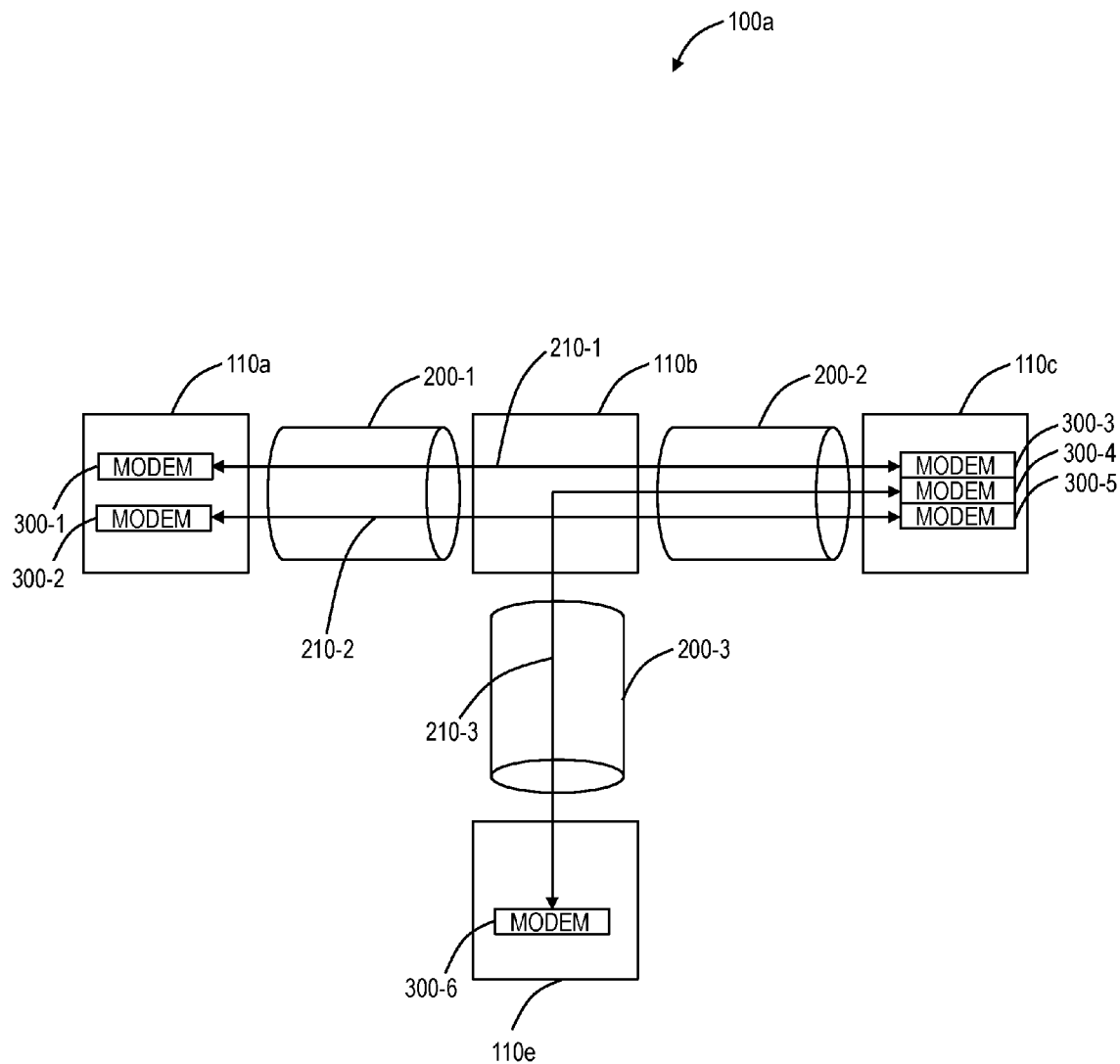
FIG. 3 is a logical network diagram of a subset of the network of FIG. 1 showing the sites and three exemplary wavelengths.

Referring to FIG. 3, in an exemplary embodiment, a logical network diagram illustrates a subset 100a of the network 100 showing the sites 110a, 110b, 110c, 110e and three exemplary wavelengths 210-1, 210-2, 210-3. In the subset 100a, there is a fiber 200-1 connecting the sites 110a, 110b, a fiber 200-2 connecting the sites 110b, 110c, and a fiber 200-3 connecting the sites 110b, 110e. The wavelengths 210-1, 210-2 are between the sites 110a, 110c and through the fibers 200-1, 200-2 with an express through at the site 110b, and the wavelength 210-3 is between the sites 110e, 110c through the fibers 200-3, 200-2 with an express through at the site 110b. The site 110a includes modems 300-1, 300-2, the site 110c includes modems 300-3, 300-4, 300-5, and the site 110e includes a modem 300-6. Thus, the wavelength 210-1 is formed by the modems 300-1, 300-3, the wavelength 210-2 is formed by the modems 300-2, 300-5, and the wavelength 210-3 is formed by the modems 300-6, 300-4. The various wavelengths 210-1, 210-2, 210-3 can carry any type of traffic such as, without limitation, Optical Transport Network (OTN), SONET, SDH, Ethernet, Frame Relay, Internet Protocol (IP), MPLS, and the like as well of combinations thereof.

Superchannels

Generally, Wavelength Selective Switches (WSSs) and the like are essentially a polychrometer device with multiple output/input ports. Individual wavelengths (i.e., signals) can be switched by such a device, and relatively sharp roll-offs can be achieved. That is, the WSS may be utilized to provide a demultiplexer function. The WSS can provide significantly improved roll-off portions from other technologies such as arrayed waveguide gratings (AWGs) or thin film filters (TFFs). However, a significant dead band is still needed for the WSS to separate two signals. In contrast, coherent modems can separate signals in the electrical domain which eliminates almost all of the dead band. Advantageously, through such a configuration, deadbands or guardbands may be reduced or eliminated.

In an exemplary embodiment, using concatenated optical spectrum transmission systems and methods and a flexible grid, wavelengths may be configured to group A-Z demands together and place signals in the spectrum going on the same path without deadbands between the channels in the same path. In this manner, such a grouping can be referred to as a "superchannel." The superchannel grouping is an exemplary technique that may be used by the margin-based optimization systems and methods to achieve more bandwidth (higher spectral efficiency) at the expense of routing constraints.

Generally, one optical modem is associated with the optical signal which is the result of modulating an electrical signal onto one optical carrier, forming a data-bearing signal. That electrical signal may have a single carrier such as with a single Time Division Multiplexing (TDM) stream of QPSK symbols, a plurality of carriers such as with Nyquist Frequency-Division Multiplexing (FDM), or a very large number of carriers such as with Orthogonal Frequency-Division Multiplexing (OFDM).

In the more straightforward applications, one optical modem communicates a bidirectional digital service from a first geographic location to a second geographic location. A superchannel can be formed by grouping into a contiguous region of the optical spectrum the signals from a plurality of modems that are all following the same path. The "radio ROADM" technique can be used to coherently multiplex and then demultiplex a superchannel at a plurality of geographic locations while the superchannel is switched as a single entity by the intermediate WSS.

Modems

Figure 4:
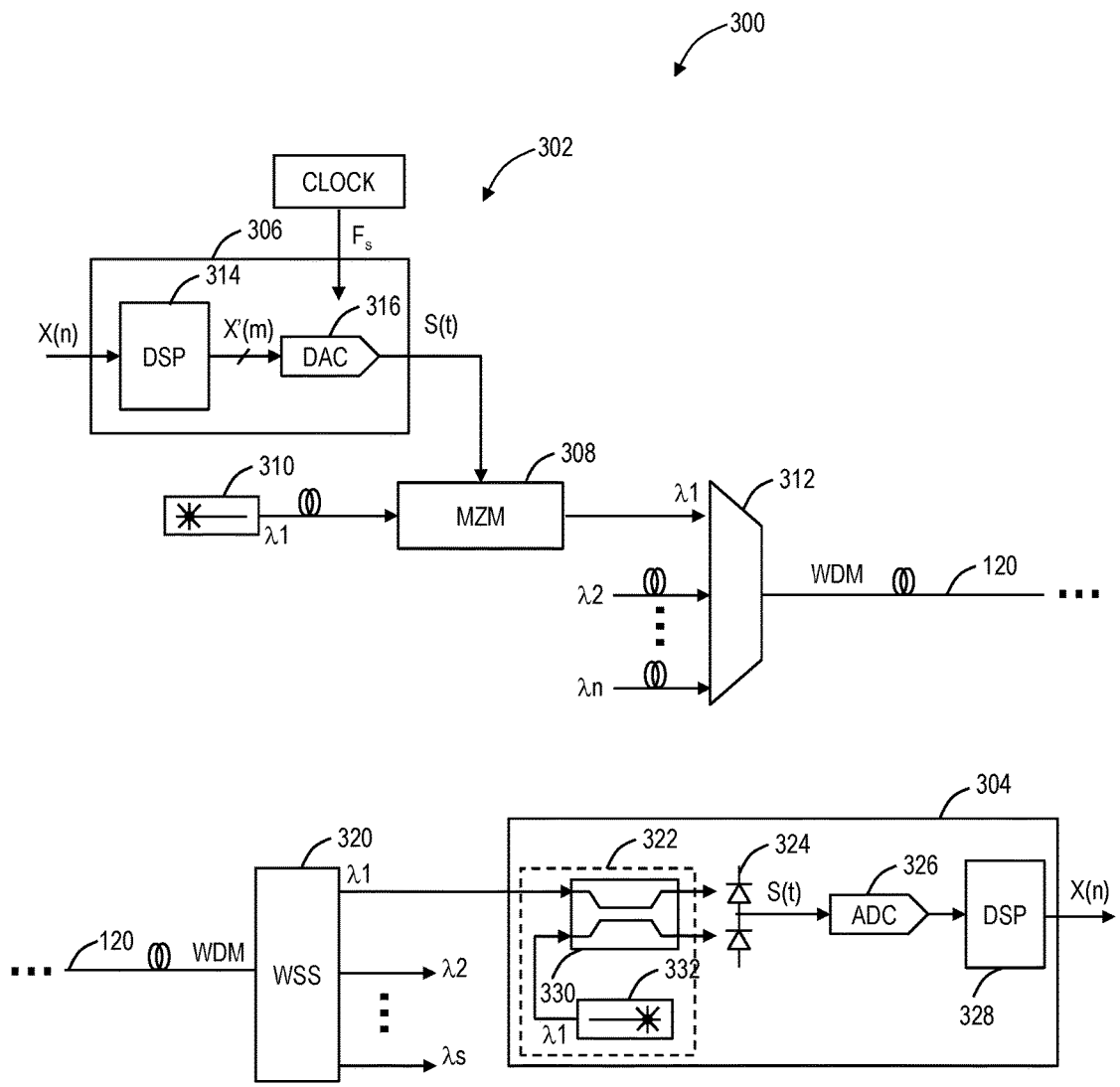
FIG. 4 is a block diagram of an exemplary implementation of an optical modem which generally includes a transmitter modem and a receiver modem communicatively coupled to one another via the link.

Referring to FIG. 4, in an exemplary embodiment, a block diagram illustrates an exemplary implementation of an optical modem 300 which generally includes a transmitter modem 302 and a receiver modem 304 communicatively coupled to one another via the link 120. The transmitter modem 302 typically includes a signal generator 306 for converting a digital signal X(n) to be transmitted into a drive signal S(t) which drives a modulator 308 (e.g., a Mach-Zehnder Modulator (MZM)). The modulator 308 modulates a narrow-band optical carrier, generated by a laser 310 tuned to a predetermined center wavelength $\lambda_1$ (among other center wavelengths $\lambda_2$ to $\lambda_n$), to generate a corresponding optical channel signal, i.e., a data-bearing signal. The resultant signal may then be multiplexed by a multiplexer 312 into a Wavelength Division Multiplexed (WDM) signal for transmission over the optical fiber link 120 to the receiver modem 304. Typically, the drive signal S(t) is a radio frequency (RF) analog electrical signal. In such cases, the signal generator 306 may include a Digital Signal Processor (DSP) 314 cascaded with a Digital-to-Analog Converter (DAC) 316. The DSP 314 operates to process the digital signal X(n) to generate a corresponding digital drive signal X'(m), which is designed in accordance with the performance and operating requirements of the DAC 316. The DAC 316 operates in a conventional manner to convert the digital drive signal X'(m) into the required analog RF drive signal S(t) for modulation onto the optical carrier.

The optical channel signal can be demultiplexed and routed through the optical communications network 100 using filter based demultiplexer devices or Wavelength Selective Switches (WSSs). For illustration purposes, the receiver modem 304 is shown as coupled to a drop port of a WSS 320, which operates to communicatively couple the channel signal from of an inbound WDM signal to the receiver modem 304.

The receiver modem 304 include an optical front end 322 for supplying the optical channel signal to a photodetector block 324, which operates to detect the incoming optical channel signal and generate an electrical photodetector current containing spectral components corresponding to the high-speed signal S(t). The photodetector current is then sampled by an Analog-to-Digital Converter (ADC) 326 and processed by a corresponding DSP 328 in the receiver modem 304 using various digital signal processing techniques to recover the original digital signal X(n). In the design of FIG. 4, the optical front end 322 can be provided by a mixer 330, which combines the incoming optical channel signal with a narrow-band light generated by a local laser 332 tuned to the center wavelength $\lambda_1$ of the optical channel signal. This arrangement may be used to enable coherent detection of the optical channel signal. However, other arrangements, such as well-known direct detection techniques, may also be used.

Coherent detection has the potential to provide access to a rich set of information on the optical field. Despite this, current practices in performance budgeting and system acceptance focus only on the start-of-life (SOL) pre-forward-error-correction (pre-FEC) bit error ratio, translated to dBQ2, or alternatively SOL optical signal-to-noise ratio (OSNR) and ignore the set of measures offered by coherent technology. This is largely because conventional techniques for optical modem characterization, end-of-life (EOL) performance prediction, and performance margin measurement rely heavily on optical noise loading, which is a timely and expensive process, requiring specialized skills and equipment, and is impractical at best. By contrast, devices, components, methods, and other techniques are provided herein that facilitate modem characterization using digital noise loading to derive performance budgets and perform other operations.

In an exemplary embodiment, each optical modem 300 is tunable so that it can selectively generate a wavelength centered at the desired carrier wavelength (or frequency). In exemplary embodiments in which tunable modem 300 are used, the wavelength range of each modem 300 may be wide enough to enable the modem 300 to generate any wavelength in the optical spectrum. In other exemplary embodiments, the wavelength range of each modem 300 may be wide enough to enable the modem 300 to generate anyone of a subset of wavelengths in the optical spectrum. The modem 300 may be configured to use any of duo-binary, quadrature amplitude modulation (QAM), differential phase shift keying (DPSK), differential quadrature phase shift keying (DQPSK), orthogonal frequency-division multiplexing (OFDM), polarization multiplexing with any of the foregoing, and any other type of coherent optical modulation and detection technique. It is understood that for electronic channel discrimination, a tunable Rx is required. In nQAM and nPSK it is achieved using a linear receiver, i.e. a receiver where frequency mixing is taking place between a local oscillator and the incoming signal. The Local Oscillator (LO) needs to be tuned at the right frequency such that the mixing product can be at base band where all the necessary filtering will occur. If a receiver is not operating like above, it requires a tunable optical filter prior to the optical detector.

The systems and methods recognize the ability of each of the modems 300 can be optimized based on 1) the underlying modem's 300 abilities to adjust and 2) the service's need being carried by the wavelength. The modems 300 can support various different baud rates through software-programmable modulation formats. The modems 300 can support programmable modulation or constellations with both varying phase and/or amplitude. In an exemplary embodiment, the modems 300 can support multiple coherent modulation formats such as, for example, i) dual-channel, dual polarization (DP) binary phase-shift keying (BPSK) for 100 G at submarine distances, ii) DP quadrature phase-shift keying (QPSK) for 100 G at ultra long haul distances, iii) 16-quadrature amplitude modulation (QAM) for 200 G at metro to regional (600 km) distances), or iv) dual-channel 16 QAM for 400 G at metro to regional distances. Thus, in an exemplary embodiment, the same modem 300 can support 100 G to 400 G. With associated digital signal processing (DSP) in the modem 300 hardware, moving from one modulation format to another is completely software-programmable.

In another exemplary embodiment, the modem 300 can support N-QAM modulation formats with and without dual-channel and dual-polarization where N can even be a real number and not necessarily an integer. Here, the modem 300 can support non-standard speeds since N can be a real number as opposed to an integer, i.e. not just 100 G, 200 G, or 400 G, but variable speeds, such as 130 G, 270 G, 560 G, etc. These rates could be integer multiples of 10 Gb/s, or of 1 Gb/s. Furthermore, with the DSP and software programming, the capacity of the flexible optical modem can be adjusted upwards or downwards in a hitless manner so as not to affect the guaranteed rate. In other exemplary embodiments, the modem 300 can include hardware which lacks the aforementioned functionality and thus supports a single modulation format/baud rate which cannot be adjusted (but other parameters can be adjusted like power, spectrum location, etc.). Additionally, the modems 300 can tune and arbitrarily select spectrum; thus no optical filters are required. Additionally, the modem 300 can support various aspects of nonlinear effect mitigation and dispersion compensation (both for chromatic and polarization mode) in the electrical domain, thus eliminating external dispersion compensation devices, filters, etc. Modems can also adapt the forward error correction coding that is used, as another method to trade-off service rate vs. noise tolerance.

The modems 300 can include coherent receivers which require no optical dispersion compensation or optical filters (multiplexers and demultiplexers). Also, the modems 300 can support advanced Performance Monitoring (PMs) for feedback such as Bit Error Rate (BER), Polarization Dependent Loss (PDL), Polarization Mode Dispersion (PMD), and the like to provide accurate modeling of optical characteristics. The modems 300 include coherent transmitters which can provide spectral shaping allowing for more efficient spectrum use and flexible grid placement. Also, the coherent transmitters support software-selectable modulation format, providing more bits/s/Hz.

Wavelengths that are spaced closer together provide improved spectral efficiency, as discussed. However, non-linearities such as Cross-Phase-Modulation (XPM) generally cause greater degradations when there is less channel separation for the walk-off. This will reduce the capacity of each channel. As described herein, a channel or optical channel refers to the medium, including switching, filters (WSSs), etc., which are set up in a network to carry a signal or optical signal between two points. A signal or optical signal refers to light having been modulated to carry information which traverses the medium within the channel. Also, a wavelength is sometimes used to mean signal or optical signal. Note, sometimes the term channel is equated to a signal or wavelength, through an implied one-to-one correspondence.

A higher power in a given signal (wavelength) will improve its optical signal to noise ratio (OSNR). However, higher powers also cause stronger nonlinear effects which are generally degradations to the signal itself and to other signals. Optical amplifiers, or other optical elements, may limit the average total output power from that element. At a given power, a higher Baud rate signal will generally cause less XPM. The modulation applied to the signal can be designed to induce less nonlinear degradation in the other signals present in the fiber, generally at a cost of a portion of the bitrate or noise tolerance of that modulation.

Depending upon the type of fiber, and any optical dispersion compensation present, higher Baud rates or lower Baud rates will be advantageous for minimizing self-phase modulation (SPM), at a constant composite average power level. Some kinds of fibers, such as Dispersion Shifted (DS) fiber generate severe degradations due to Four-Wave Mixing (FWM), as a strong function of the wavelength locations relative to the fiber dispersion zero. The separation between channels can be squeezed to be less than the Baud rate, and the inevitable resulting linear intersymbol and interchannel interference reduces the system margin. DSP methods such as MLSE or multiple channel co-detection can be used to mitigate some of this reduction. Optical CDMA methods attempt to superimpose multiple wavelengths onto the same spectrum.

Digital Noise Loading

Figure 5:
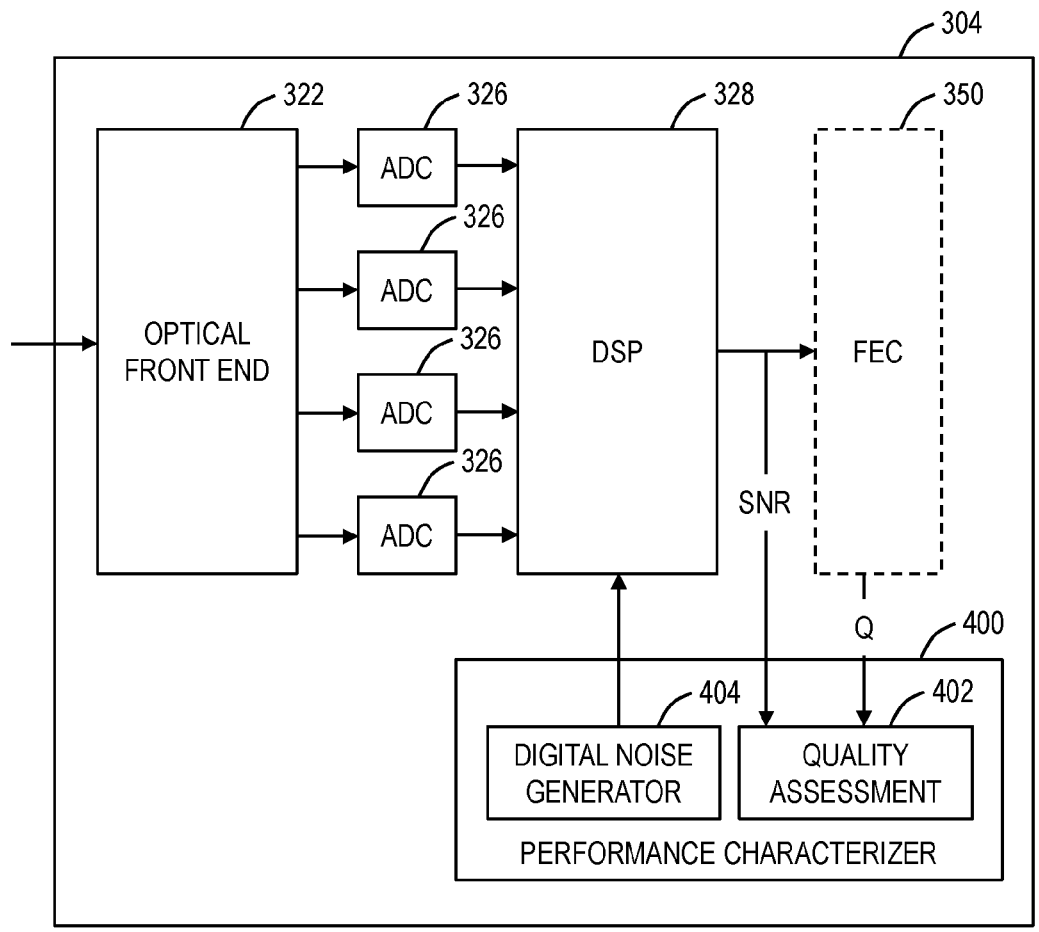
FIG. 5 is a block diagram of a coherent optical receiver modem adapted for digital noise loading according to various embodiments.

Referring to FIG. 5, in an exemplary embodiment, a block diagram illustrates a coherent optical receiver modem 304 adapted for digital noise loading according to various embodiments. Again, the coherent optical receiver 304 includes the optical front end 322, one or more ADCs 326, and the DSP 328, the operations of which are described above in connection with FIG. 4. It will be appreciated that the optical receiver modem 304 may also include other components known in the art, such as the optionally illustrated Forward Error Correction (FEC) unit 350 and so on. Here, the coherent optical receiver modem 304 also includes a built-in performance characterizer 400 adapted to manage the performance of the coherent optical receiver modem 304. In the design of FIG. 5, the performance characterizer 400 includes a quality assessment unit 402 and a digital noise generator 404.

The quality assessment unit 402 is adapted to provide a signal quality measure for a communication signal received at the coherent receiver modem 304. The signal quality measure may be, for example, an electrical Signal-to-Noise Ratio (SNR) measurement or a Quality factor (Q-factor or Q) measurement of the communication signal. As shown, the SNR is generally measured before further processing by the FEC unit 350, for example, while Q (or $Q^2$) is generally measured after further processing by the FEC unit 350. FEC processing is commonly provided in coherent optical modems and other types of telecommunications equipment to reduce errors in data being transmitted over a communications link 120 without requiring retransmission of data. SNR and Q measurements provide two distinct although related measures of quality to assess the viability of a given communication signal.

The digital noise generator 404 is adapted to apply digital noise to the communication signal to facilitate receiver characterization. As shown, in contrast to conventional optical noise loading techniques, the digital noise generator 404 may apply the digital noise to the coherent optical receiver modem 304 directly, such as via processing performed by the DSP 328. This is advantageous over systems that rely on optical noise loading or even digital noise loading at the transmitter modem 302, which distorts the transmitted signal waveform and changes its interaction with the propagation medium, thereby changing the nonlinear propagation penalty.

Examples of the digital noise generator 404 include digital error filters that can be applied to the digital data path to generate noise from the digital signal itself (which can be implemented using an existing number of logic gates) as well as dedicated digital noise generators (which may require additional gates). In one design, the digital noise generator 404 may use one or a combination of filters to add white Gaussian noise to the communication signal at the coherent optical receiver modem 304, causing a deterministic reduction in signal quality of the communication signal as processed by the DSP 328. The white Gaussian noise may be applied as independent Gaussian random variables for each sample, with the independence being maintained across both adjacent time samples and across each of the ADC channels. In other embodiments, the noise added may be non-white and/or non-Gaussian if desired, and may include asymmetric radial and angular components. For example, a correlation may be added to the Gaussian random variables and controlled across the time samples and across each of the ADC channels (i.e., "colored" noise). As another example, a different amplitude probability density function other than Gaussian may be used (e.g., Maxwellian). The amount of noise applied may be preset or dictated by a remote operator, such as a system technician or designer.

When used in combination, the different filters may serve different or complimentary functions. For example, the DSP 328 may contain two sets of filters, static and dynamic. For digital noise generators, the generated noise may be added to the signal by augmenting it on to the static filter in the DSP 328. This noise may be made dependent on the filter coefficients, and accordingly, distributed such that its effect on the signal does not change with varying filter coefficients. Furthermore, depending on the structure of the static filter, the noise may be added in a manner so that the dynamic filter in the DSP 328 does not compensate for it.

The quality assessment unit 402 is then further configured to detect a change in the quality of the communication signal at the coherent optical receiver modem 304 in response to the application of the digital noise. Based on the change in signal quality, the performance characterizer 400 may be configured to determine a performance margin and/or an operating characteristic of the coherent optical receiver modem 304, for example, which provides more real-world, real-time operating information than optical noise loading experiments and which may be used for a variety of equipment monitoring and management functions. In some embodiments, the operating characteristic may include values for different performance measures at a given operating point of the coherent optical receiver modem 304. A relationship between the two performance measures may accordingly be derived based on the change in the quality of the communication signal and a level of the digital noise applied. For example, the quality assessment unit 402 may be configured to measure the electrical SNR and/or Q-factor of the communication signal before and after application of the digital noise, and the resultant degradation may be used to determine a relationship between the SNR and Q performance measures (e.g., the dependence of Q on SNR). The relationship between the SNR and Q performance measures can be used to extract performance margins for either measure (e.g., based on a failure point defined for the other), or for other performance measures by converting based on a known relationship. Such performance margins generally represent the difference between a current operating condition and a failure condition for processing the communication signal.

In other embodiments, performance margins may be measured directly by the performance characterizer 400 based on the change in signal quality. For example, the digital noise generator 404 may apply digital noise to the communication signal insufficient magnitude to cause a failure condition (e.g., FEC failure at the FEC unit 350) in decoding or otherwise processing the communication signal. The quality assessment unit 402 may then determine the signal quality degradation at the point of failure, with the magnitude of the degradation to failure directly indicating the performance margin for that performance measure. As noted above, for performance measures that may not be directly measurable at the coherent optical receiver modem 304, performance margins may still be determined based on a known relationship with other values. For example, Q factor is a function of electrical SNR and OSNR is a deterministic component of the electrical SNR. Therefore, lowering the electrical SNR has an equivalent impact on performance as lowering the system OSNR. The electrical SNR may be lowered to FEC failure, and the SNR margin may be measured. The SNR margin may then be converted to an OSNR margin based on the dependence of SNR on OSNR.

It will be appreciated that once performance measures of the coherent optical receiver modem 304 have been determined according to the digital noise loading techniques herein, various methods for system characterization known in the art (e.g., those used for optical noise loading based characterizations) may be similarly employed or adapted to systems with digital noise loading capabilities. For example, the Q to OSNR relationship may be used to extract other components of the electrical SNR, including modem and propagation components. As another example, a Power Budget Table (PBT) may be constructed, in accordance with the International Telecommunication Union (ITU) specification G.977 or other requirements. However, such system characterization procedures may be more effectively automated and practiced in real-world, real-time environments when employed or adapted to the systems with digital noise loading capabilities facilitated herein. Further, the dynamic performance measures and system characterizations may be used to adjust one or more operating parameters of the optical communications network (e.g., transmission power, data rates), trigger one or more alerts (e.g., service calls, equipment replacements), etc., based on the determined performance margins and/or operating characteristics, functionality that has been heretofore impractical at best.

Figure 6:
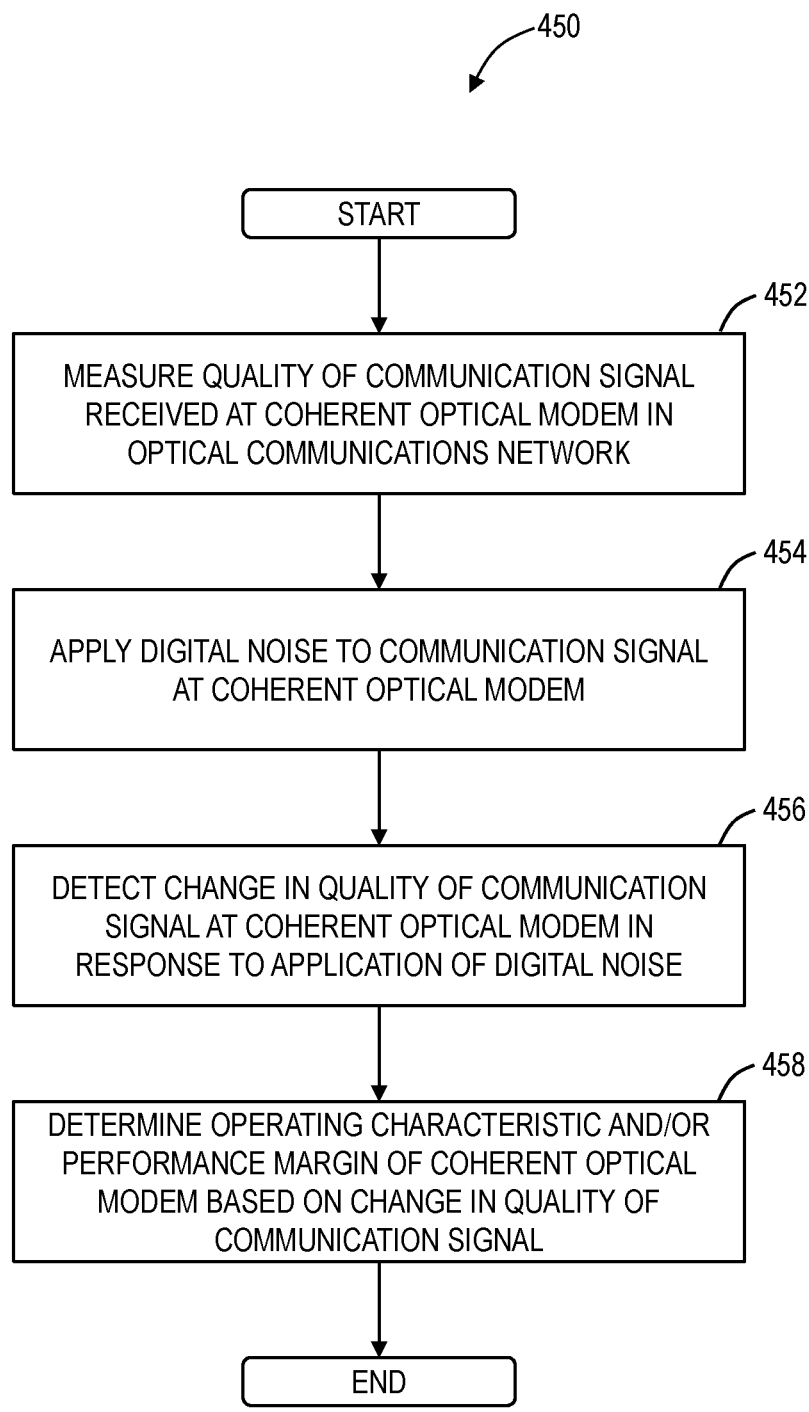
FIG. 6 is a flowchart of an example process for managing performance of an optical communications network according to various embodiments.

Referring to FIG. 6, in an exemplary embodiment, a flowchart illustrates an example process 450 for managing the performance of an optical communications network according to various embodiments. The process 450 includes measuring a quality of a communication signal received at a coherent optical receiver modem in the optical communications network (step 452), such as the coherent optical receiver modem 304 described above. Digital noise may then be applied to the communication signal at the coherent optical receiver (step 454), and a change in the quality of the communication signal at the coherent optical receiver may be detected in response to the application of the digital noise (step 456). Based on the change in the quality of the communication signal, an operating characteristic and/or a performance margin of the coherent optical receiver may be determined in accordance with various embodiments (step 458).

As discussed in more detail above, in certain embodiments, the applied digital noise may be substantially Gaussian or white noise and may be applied to the communication signal via a filter at a digital signal processor (e.g., the DSP 328) of the coherent optical receiver modem 304. The quality of the communication signal may correspond to a quality factor or a signal-to-noise ratio. The operating characteristic may include values for two performance measures at a given operating point of the coherent optical receiver, for example, and the process 450 may further include determining a relationship between the two performance measures based on the change in the quality of the communication signal and a level of the digital noise applied. The performance margin may be a quality factor margin or a signal-to-noise ratio margin, for example, representing the difference between a current operating condition and a failure condition for processing the communication signal.

As also discussed in more detail above, in some embodiments, determining the operating characteristic and/or the performance margin may include determining a first performance margin for a first performance measure of the coherent optical receiver and converting the first performance margin into a second performance margin for a second performance measure of the coherent optical receiver (e.g., based on a known relationship between the first and second performance measures). For direct margin determinations, the digital noise may be applied up to a failure condition for processing the communication signal, with the performance margin being determined based on a magnitude of the change in meeting the failure condition. In still further embodiments, the process 450 may further include adjusting one or more operating parameters of the optical communications network and/or triggering an alert based on the determined performance margin and/or operating characteristic.

The aforementioned receiver-based digital noise loading techniques are described in commonly-assigned U.S. patent application Ser. No. 13/897,872, filed May 20, 2013, and entitled "DIGITAL NOISE LOADING FOR OPTICAL RECEIVERS," the contents of which are incorporated by referenced herein. Additionally, transmitter-based digital noise loading techniques are described in commonly-assigned U.S. Pat. No. 7,561,797, issuing on Jul. 14, 2009, and entitled "OPTICAL SIGNAL TRANSMITTER WITH ACTIVE OPTICAL E-FIELD DEGRADATION," the contents of which are incorporated by referenced herein.

Margin Determination

In various exemplary embodiments, the margin determination systems and methods include a measurement-based approach to determine system margin in an optical network. The systems and methods include utilizing digital noise loading techniques, power changes, etc. to determine an actual amount of noise and margin. As such, the systems and methods provide an accurate view of actual margin which can be used with the optical modem 300 to provide flexible spectrum usage. Again, the systems and methods can include 1. Using the system as a control to provide perturbation to separate single channel penalty contributions to a single metric provided by an optical modem;
2. Using system level knowledge to separate multichannel effects from the single metric provided by the optical modem; and
3. Driving system level optimization from margin metrics measured by the optical modems.

Specifically, the systems and methods provide system-level margin determination since an individual optical modem cannot make autonomous capacity optimizing decisions in a non-linear system, such as an optical network.

Figure 7:
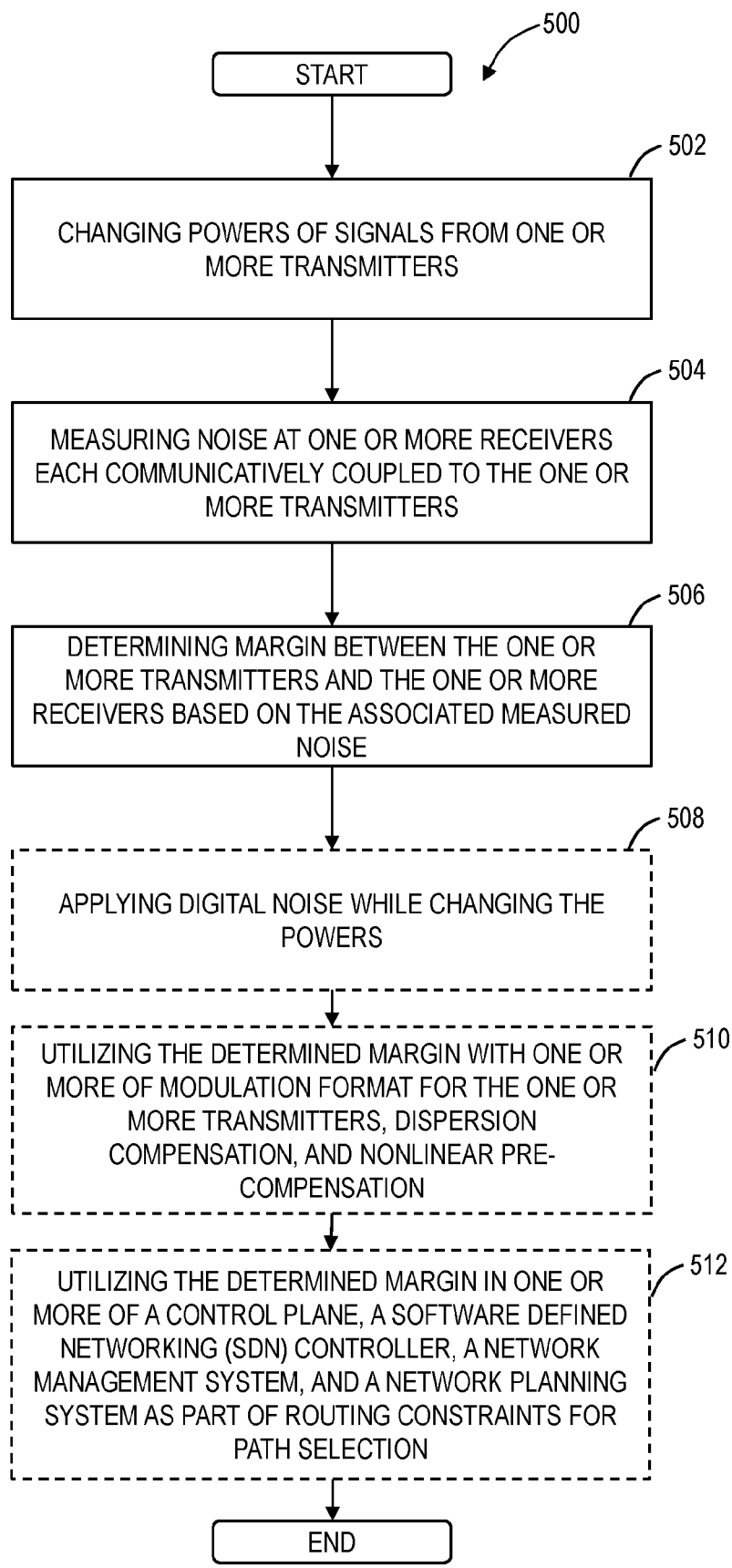
FIG. 7 is a flowchart of a process of determining margin in an optical network.

Referring to FIG. 7, in an exemplary embodiment, a flowchart illustrates a process 500 of determining margin in an optical network. The process 500 includes changing powers of signals from one or more transmitters (step 502); measuring noise at one or more receivers each communicatively coupled to the one or more transmitters (step 504); and determining margin between the one or more transmitters and the one or more receivers based on the associated measured noise (step 506). The process 500 can include applying digital noise while changing the powers (step 508). The process 500 can also include utilizing the determined margin with one or more of modulation format for the one or more transmitters, dispersion compensation, and nonlinear pre-compensation (step 510). The process 500 can also include utilizing the determined margin in one or more of a control plane, a Software Defined Networking (SDN) controller, a network management system, and a network planning system as part of routing constraints for path selection (step 512). The measured noise can be separated between linear noise which is proportional to power and nonlinear noise which is proportional to power squared.

The changing, the measuring, and the determining are performed in-service while the one or more transmitters are each transmitting data-bearing signals. Optionally, the changing can include changing a single transmitter at a time, and the measuring noise can include determining cross phase modulation based on relationships between neighboring signals and self-phase modulation based on a signals relationship with itself at the launch powers. Alternatively, the changing can include changing a group of signals at a time, and the measuring noise can include determining cross phase modulation based on relationships between neighboring signals and self-phase modulation based on a signals relationship with itself at the launch powers. Optionally, the changing powers can include changing launch powers of the one or more signals, in-service while the one or more signals carry data-bearing signals. Alternatively, the changing powers can include changing amplifier output powers, in-service while the one or more signals carry data-bearing signals.

In another exemplary embodiment, an apparatus adapted to determine margin in an optical network includes circuitry adapted to change powers of signals from one or more transmitters; circuitry adapted to measure noise at one or more receivers each communicatively coupled to the one or more transmitters; and circuitry adapted to determine margin between the one or more transmitters and the one or more receivers based on the associated measured noise.

In a further exemplary embodiment, a server adapted to determine margin in an optical network includes a processor; and memory storing instructions that, when executed, cause the processor to cause a change powers of signals from one or more transmitters, cause a measurement of at or by one or more receivers each communicatively coupled to the one or more transmitters, and determine margin between the one or more transmitters and the one or more receivers based on the associated measured noise.

Advantageously, these techniques can be used to improve the economics for maximizing operating capacity. Secondly, these techniques can be used to provide other benefits, such as additional resiliency due to understanding the margin on primary paths, and also on restoration paths. In the time-frame of emerging flexible optical modems 300, these systems and methods will become fundamental for capacity optimization. The system level claims are instrumental in that individual modems cannot make autonomous capacity optimizing decisions in a non-linear system.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of determining margin in an optical network, the method comprising:
    changing powers of signals from one or more transmitters;
    measuring noise at one or more receivers each communicatively coupled to the one or more transmitters;
    determining margin between the one or more transmitters and the one or more receivers based on the associated measured noise; and
    utilizing the determined margin with one or more of modulation format for the one or more transmitters, dispersion compensation, and nonlinear pre-compensation.

2. The method of claim 1, wherein the measured noise is separated between linear noise which is proportional to power and nonlinear noise which is proportional to power squared.

3. The method of claim 1, further comprising:
    applying digital noise while changing the powers.

4. The method of claim 1, wherein the changing, the measuring, and the determining are performed in-service while the one or more transmitters are each transmitting data-bearing signals.

5. The method of claim 1, wherein the changing comprises changing a single transmitter at a time and the measuring noise comprises determining cross phase modulation based on relationships between neighboring signals and self-phase modulation based on a signals relationship with itself at the launch powers.

6. The method of claim 1, wherein the changing comprises changing a group of signals at a time and the measuring noise comprises determining cross phase modulation based on relationships between neighboring signals and self-phase modulation based on a signals relationship with itself at the launch powers.

7. The method of claim 1, wherein the changing powers comprises changing launch powers of the one or more signals, in-service while the one or more signals carry data-bearing signals.

8. The method of claim 1, wherein the changing powers comprises changing amplifier output powers, in-service while the one or more signals carry data-bearing signals.

9. The method of claim 1, further comprising:
    utilizing the determined margin in one or more of a control plane, a Software Defined Networking (SDN) controller, a network management system, and a network planning system as part of routing constraints for path selection.

10. An apparatus adapted to determine margin in an optical network, the apparatus comprising:
    circuitry adapted to change powers of signals from one or more transmitters;
    circuitry adapted to measure noise at one or more receivers each communicatively coupled to the one or more transmitters;
    circuitry adapted to determine margin between the one or more transmitters and the one or more receivers based on the associated measured noise; and
    circuitry adapted to utilize the determined margin with one or more of modulation format for the one or more transmitters, dispersion compensation, and nonlinear pre-compensation.

11. The apparatus of claim 10, wherein the measured noise is separated between linear noise which is proportional to power and nonlinear noise which is proportional to power squared.

12. The apparatus of claim 10, further comprising:
    circuitry adapted to apply digital noise while changing the powers.

13. The apparatus of claim 10, wherein the circuitry operates in-service while the one or more transmitters are each transmitting data-bearing signals.

14. The apparatus of claim 10, wherein the circuitry adapted to change powers comprises changing a single transmitter at a time and the circuitry adapted to measure noise comprises determining cross phase modulation based on relationships between neighboring signals and self-phase modulation based on a signals relationship with itself at the launch powers.

15. The apparatus of claim 10, wherein the circuitry adapted to change powers comprises changing a group of signals at a time and the circuitry adapted to measure noise comprises determining cross phase modulation based on relationships between neighboring signals and self-phase modulation based on a signals relationship with itself at the launch powers.

16. The apparatus of claim 10, wherein the circuitry adapted to change powers comprises changing launch powers of the one or more signals, in-service while the one or more signals carry data-bearing signals.

17. The apparatus of claim 10, wherein the circuitry adapted to change powers comprises changing amplifier output powers, in-service while the one or more signals carry data-bearing signals.

18. The apparatus of claim 10, further comprising:
circuitry adapted to utilize the determined margin in one or more of a control plane, a Software Defined Networking (SDN) controller, a network management system, and a network planning system as part of routing constraints for path selection.

19. A method of determining margin in an optical network, the method comprising:
changing powers of signals from one or more transmitters via changing one or more of launch powers of the one or more transmitters and amplifier output powers in-service while the signals carry data-bearing signals;
measuring noise at one or more receivers each communicatively coupled to the one or more transmitters, wherein the measuring noise comprises determining cross phase modulation based on relationships between neighboring signals and self-phase modulation based on a signals relationship with itself based on the changed powers; and
determining margin between the one or more transmitters and the one or more receivers based on the associated measured noise.

20. The method of claim 19, further comprising:
utilizing the determined margin with one or more of modulation format for the one or more transmitters, dispersion compensation, and nonlinear pre-compensation.

* * * * *